Aug. 31, 1943.     E. A. HOBART     2,328,452
SPEED REGULATOR FOR ENGINES
Filed Aug. 30, 1941     3 Sheets-Sheet 1
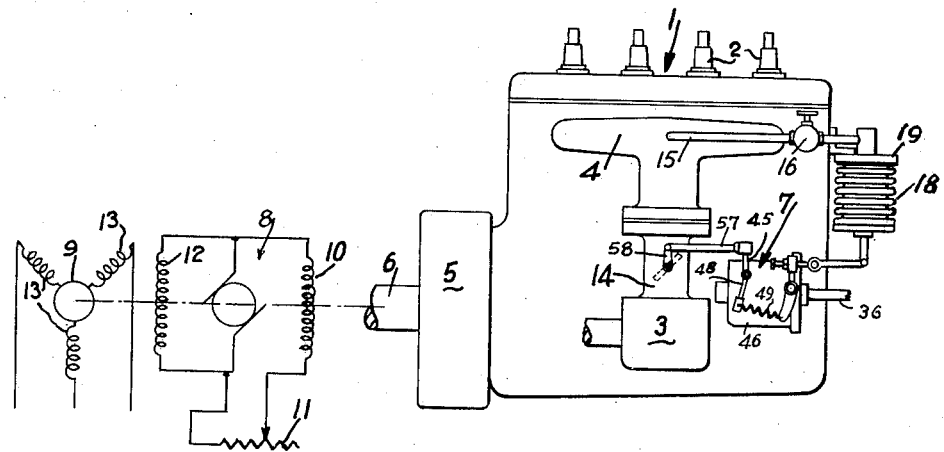
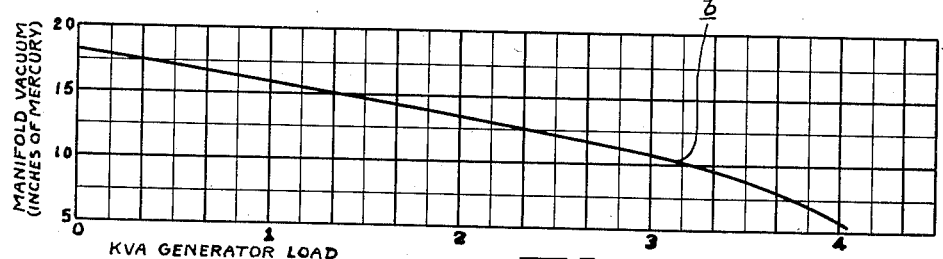
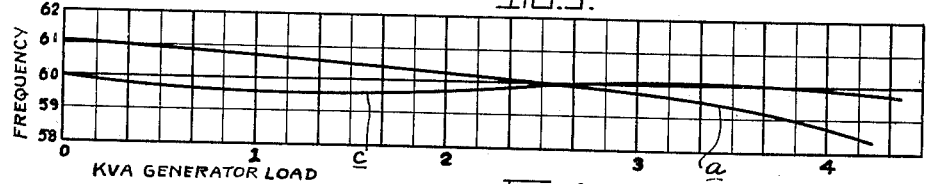
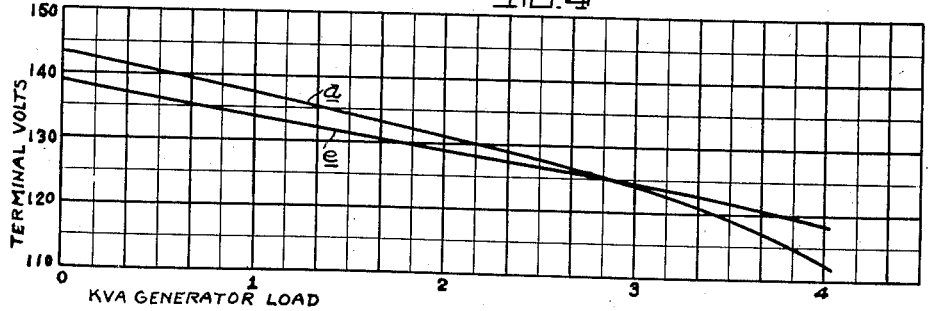
Inventor
EDWARD A. HOBART,
Toulmin & Toulmin
Attorneys

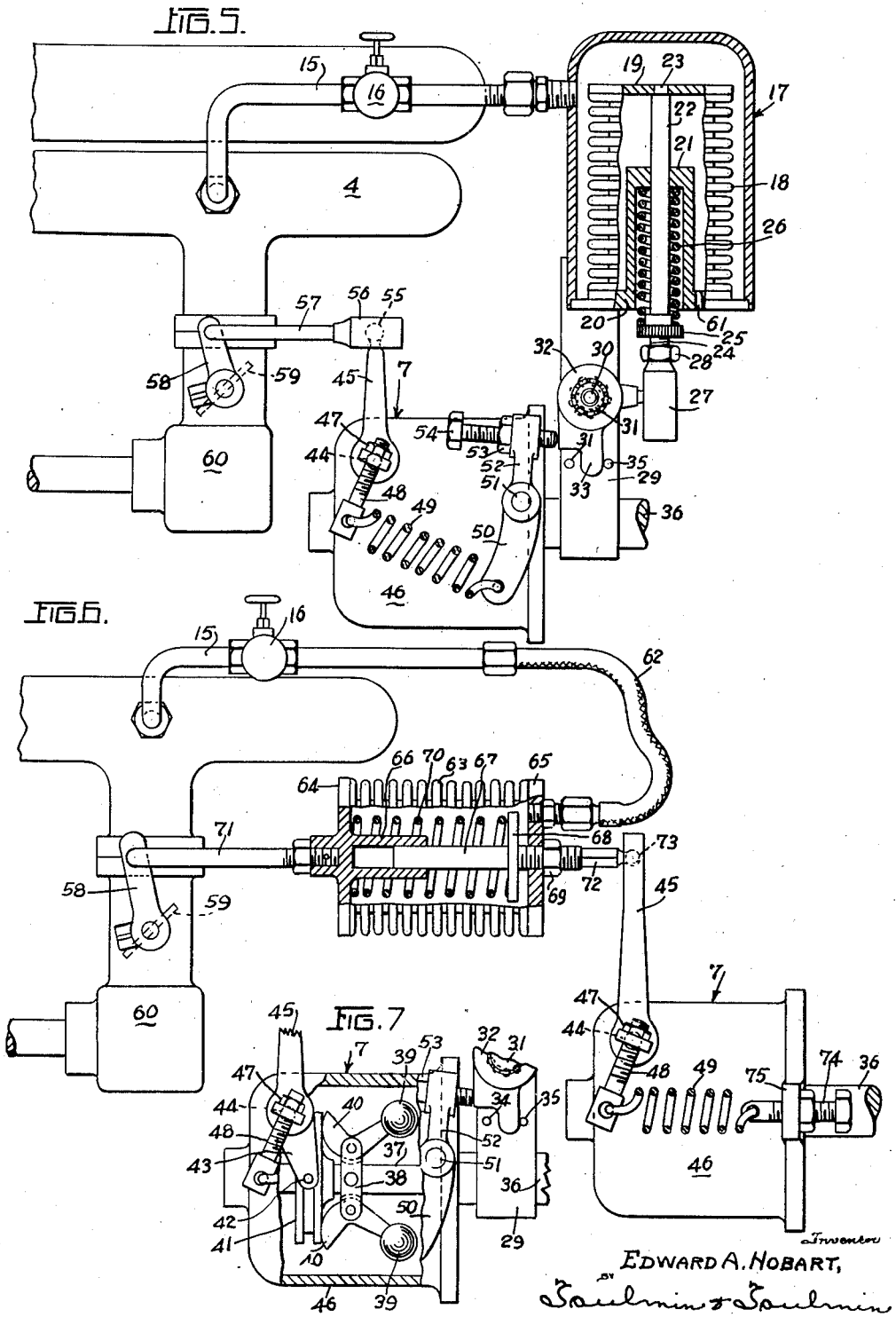

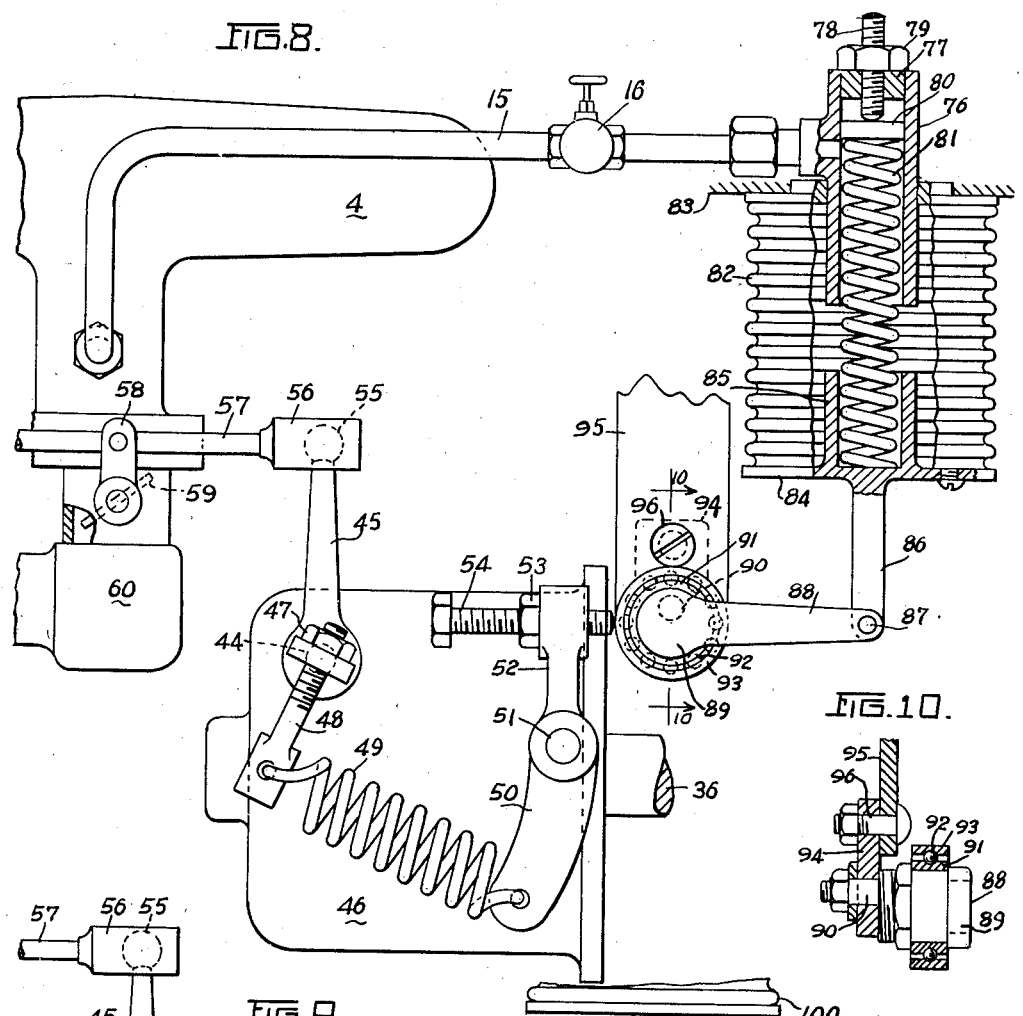
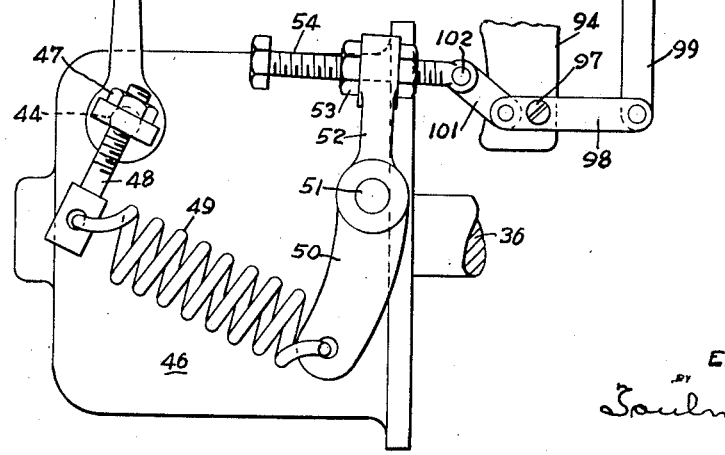

Patented Aug. 31, 1943

2,328,452

UNITED STATES PATENT OFFICE 2,328,452

SPEED REGULATOR FOR ENGINES

Edward A. Hobart, Troy, Ohio, assignor to The Hobart Bros. Company, Troy, Ohio, a corporation of Ohio Application August 30, 1941, Serial No. 409,031

1 Claim. (Cl. 123—103)

The present invention relates to combined automotive engine sets of the portable type, and more particularly to those units designed for variable loads such as when the load is suddenly applied and then withdrawn.

In the arts there is a necessity for a portable engine especially for an alternator outfit in which the frequency of the generated voltage is maintained within close limits even when the load on the alternator or any load on the engine is suddenly applied and then withdrawn. Certain kinds of alternating current apparatus as for example can be operated satisfactorily only when the frequency of the current is maintained strictly constant. This constancy of frequency requires an absolute uniformity of engine speed. However, in case the engine is of limited power and the load is greatly increased, the speed of the generator would ordinarily be reduced, and thus the frequency of the generated voltage would depart from the required frequency.

The primary object of the present invention is to provide an improved automotive engine unit which gives easy constant speed, notwithstanding the amount of load imposed on the engine, or the abruptness with which the load is applied or withdrawn.

As a corollary to the foregoing object, when the engine is connected to an electric generator, for instance the constancy of frequency requires uniformity of the instantaneous speed of the unit as a whole, which in turn improves the voltage regulation under load. This object is carried out, in brief, by controlling the normal setting of a fly ball governor with which the engine is usually equipped. Governors of this character operate on the centrifugal effect exercised by a pair of fly balls which move outwardly as the speed of the engine is increased, and this outward movement of the balls is taken through suitable mechanism to a butterfly or other fuel control valve positioned at the carburetor. It has been found that notwithstanding the use of a fly ball governor for controlling the speed of the engine under load, variations in speed are bound to occur, and these variations manifest themselves by considerable proportional changes in frequency at the generator. Even the slightest change in this frequency, brought about by a relatively small change in the speed of the generator engine unit, may prevent the satisfactory operation of certain electrically-driven or controlled devices. A fly ball governor, even of the most effective type, serves merely to maintain a constant average speed of the engine, but the instantaneous speeds may vary considerably and in turn cause corresponding instantaneous changes of the frequency.

Accordingly, another object of the invention is to provide improved apparatus by which the operation of an ordinary speed governor may be modified to maintain a strictly constant instantaneous speed at the engine, regardless of fluctuations in the load applied either at the engine or by any load thereon.

Other objects and features will be apparent upon perusal of the following specification in connection with the accompanying drawings.

In the drawings:

Figure 1 is a diagrammatic layout of a combined engine-generator unit improved in accordance with the present invention.

Figure 2 is a graph showing the relation between the manifold intake vacuum and the generator load.

Figure 3 is also a graph, indicating the improvement in the constancy of frequency brought about by the improved structure.

Figure 4 shows the improvement in voltage regulation which accompanies the improvement in the frequency of the generator or speed thereof.

Figure 5 is an enlarged detail view of the improved structure.

Figure 6 shows a modified form of the apparatus.

Figure 7 is a fragmentary view, partly in elevation and partly in section, to expose the interior elements of a typical fly ball governor which may be employed in connection with the improved speed regulator.

Figure 8 shows in diagram, with portions in section, still another form of the improved apparatus.

Figure 9 depicts a different form of mechanical connection between the bellows and the fly ball governor than that shown in the other figures.

Figure 10 is a fragmentary sectional view taken along the line 10—10 in Figure 8.

Referring more particularly to Figure 1, reference numeral 1 designates a typical form of internal combustion engine illustrated as that of a four-cylinder type, as indicated by the spark plugs 2. The carburetor of the engine is indicated at 3, this carburetor being in communication with an intake manifold 4. A flywheel for the engine is indicated at 5, the latter being carried on the main shaft 6. In addition to the flywheel for assisting in maintaining a constant speed at the shaft 6, the engine is provided with a governor, indicated at 7, which may be of the usual fly ball type and is illustrated in Figure 7. A description of the governor will be given when the improvement brought about by the present invention is described in detail.

Directly mounted on the shaft 6 or coupled thereto in any suitable manner when applied for example for operating an alternating generator, there is an exciter, also a main generator generally indicated at 8 and 9, respectively. The exciter field is indicated at 10 and is connected in shunt to the armature, a resistor 11 being connected in series with the exciter field in order to vary the field current. The main generator field is indicated at 12, and it will be noted that the generator field is energized with direct current from the armature of the exciter 8. The main generator 9 is illustrated as an alternator of the three-phase type, with the windings 13 positioned at 120° with respect to one another.

Assuming that the engine 1 is of limited power and that a fairly heavy electrical load is imposed on the generator 9, there is a tendency for the engine to slow down, at least temporarily, notwithstanding the use of the fly ball governor 7 which controls the admission of fuel gas to the engine through the butterfly valve 14. This momentary decrease in speed not only tends to give the alternator poor voltage regulation, but in addition materially reduces the frequency of the generated voltage. Certain types of electrical apparatus demand constant frequency, usually 60 cycles for proper operation, particularly when the element of time synchronization is involved. Still other apparatus requires that the voltage applied thereto shall be strictly constant regardless of the amount of current which is drawn from the generator. The invention as applied to a typical system such as has been described, is illustrated in one of its forms in Figure 5.

In accordance with the invention, certain adjustments are automatically made at the fly ball governor 7, and dependent on the intake vacuum of the engine to give the governor a new setting at the butterfly or other fuel intake valve in order to provide more fuel at this point in response to an increase in load at the generator. The mechanism for introducing the new governor setting may take the form of a bellows or diaphragm which translates the changes in the intake vacuum into mechanical movement. The invention is based on my discovery that the changes in frequency at the generator when used for this purpose and therefore the variations in the speed of the unit follow very closely the changes in the intake vacuum of the engine, so that the latter may be employed as an initiating force to give compensatory effects, from the speed standpoint.

A conduit 15 is taken from the intake manifold of the engine, and passes through a shut-off valve 16, this conduit being in communication with the interior of a casing 17, closed at the top and bottom. Within the casing there is a Sylphon metal bellows 18, closed at the top by a plate 19 but open at the bottom to receive a reentrant hollow cylindrical member 20. The latter is provided with an integral plate 21 at the top, this plate being apertured to receive a rod 22 which is secured to the plate 19, as indicated at 23. The rod 22 is threaded, as indicated at 24, to receive a flanged nut 25. There is a tension spring 26 positioned between the nut 25 and the plate 21, and contained within the cylindrical member 20. The purpose of this spring is resiliently to hold the plate 19 at the top of the bellows a predetermined distance from the bottom of the casing 17. The rod terminates at the bottom end beyond the nut 25 in an enlarged cylindrical member 27 which is threaded on the rod 22 by a nut 28.

There is a strap member 29 secured to and extending downwardly from the casing 17, this strap member being provided with an outwardly extending stub shaft 30. An inner ball race 31 is keyed to the shaft, and surrounding the ball race there is a circular disc 32 forming the other ball race and containing ball bearings by which the disc may be readily rotated about the shaft 30. The disc 32 has an integral extension projecting to the right therefrom, this extension being secured to the cylinder 27 in such a manner that as the cylinder is moved upwardly or downwardly, the disc 32 is caused rotatably to rock. The disc 32 is also provided with a downwardly extending portion which terminates in a leg 33, adapted to swing between a pair of stops 34, 35, respectively. The stop 34 may be designated the "full load" stop and the stop 35 the "no load" stop, and the purpose of these stops will be explained hereinafter.

The lower end of the strap 29 is provided with a journal for a rotary shaft 36 which is coupled to the main shaft of the engine in any suitable and well known manner (not shown). This shaft extends through the end of the speed governor 7, which is mounted on the machine in any suitable manner. The shaft is provided with a reduced diameter portion 37, within the governor, and on this shaft portion there is mounted a pair of straps 38, the ends of which carry a pair of fly ball weights 39 which terminate at the left-hand end (Figure 7), in a curvilinear or cam portion 40. The cam portions are adapted to bear against a grooved wheel 41 secured to the shaft portion 37. The groove receives a roller indicated at 42 which is carried on a lever 43, pivoted at 44. There is an arm 45 secured to the lever 43 and extending upwardly through an opening in the casing 46 of the governor. The pivot point 44 is extended to the exterior of the casing 46 by means of a shaft (not shown), and to this shaft there is secured a nut 47 which carries the threaded end of a bolt 48. The bolt is provided with a rectangular head having an aperture in which is inserted one end of a tension spring 49. The other end of the spring is secured to a lever 50 of arcuate shape, pivoted at 51 to the casing 46, and provided with an upwardly extending apertured arm 52, to which a nut 53 is secured in any suitable manner. A cap screw 54 is threaded through the nut 53, this screw being adapted to bear against the leg 33 of the disc 32. The arm 45 terminates in a spherical portion 55 which is received by a circular opening formed in an enlarged cylindrical end portion 56 of a connecting rod 57. The latter is swivelly connected to a lever 58 which controls a butterfly valve 59, positioned in an intercommunicating passageway between a carburetor 60 and the intake manifold 4 of the engine.

*Operation of the mechanical system shown in Figures 1, 5 and 7*

When the engine is direct connected for operating an alternating current generator assume that the main generator 9 and its exciter 8 are being operated by the internal combustion engine 1, and that the three machines constitute a portable unit, the generator 9 may comprise a three-phase alternator, as illustrated, the direct current for its field being provided by the exciter. Assume still further that the electrical load on the alternator is such as to require absolute constancy of frequency regardless of whether the load on the generator is high or low or whether the load is abruptly applied or withdrawn. In case the load is increased, the normal operation of the governor 7, i. e. without the benefit of the present invention, would be to move the butterfly valve 59 and thereby increase the amount of fuel gas passing into the intake manifold 4. However, it has been found that when the load has been increased to a predetermined value, the governor does not exercise the same sensitiveness of control at the new load as it did at the initial load, so that any variations in load from the average new load value produce fluctuations in the engine speed and therefore of the frequency developed at the main generator.

In accordance with the present invention, the setting of the butterfly or any fuel control valve is changed as the load changes without affecting the sensitiveness of control exercised at the governor, so that strict uniformity of speed at the generator is assured when the load conditions change. This auxiliary adjustment is brought about by the use of the bellows 18 which responds to the intake vacuum of the engine, the latter in turn varying directly with the load imposed on the engine by the increased demand at the generator. As the speed of the engine tends to decrease, the intake vacuum also decreases, which in effect causes an increase in pressure on top of the plate 23 of the bellows. The latter will contract against the pressure of the atmosphere admitted to the interior of the bellows through the vent 61, causing the rod 22 to move downwardly and the disc 32 to rotate on its shaft 33 clockwise. The arms 52, 50 are rocked counterclockwise, due to the movement of the screw 54, and the tension of the spring 49 is increased, causing the arm 45 to move to the left. This movement of the arm causes the butterfly valve 59 to take a permanently new position to admit additional fuel to the engine in order to carry the load, but at the same time allowing for further adjustment from this new position when the fly ball weights cause additional movement of the arm 45 due to further variations in the speed of the engine. In one sense the operation of the Sylphon bellows 18 may be considered to give a new setting of the butterfly valve 59 as between no load and full or half-load, while the speed governor 7 corrects any minor variation in speed from the average speed which is necessary to carry the predetermined load. The sensitiveness of the governor is therefore maintained at the new load setting of the butterfly valve, resulting in an absolute constancy of frequency produced at the alternator 9.

The invention is based upon my discovery that the instantaneous changes in frequency, due to a variable load, follow almost exactly the instantaneous changes of the intake manifold vacuum. This has been expressed graphically in Figures 2 and 3 by the curves $a$ and $b$, respectively. Curve $a$ shows a variation of frequency, using 60 cycles as an average, against the load as an abscissa, based on k.v.a. at the generator. The curve $b$ is drawn between the manifold vacuum (inches of mercury) and the k.v.a. generator load as an abscissa. It will be noted that each of these two curves has practically the same instantaneous droop.

As a result of the additional control exercised on the butterfly valve by an intake vacuum-responsive device, the frequency at the generator is maintained substantially constant from zero to full load, as indicated by the characteristic $c$ in Figure 3. The slight droop in the frequency around 1¼ k. v. a. in the curve $c$, and again at a position beyond the full load (4 k. v. a.) is due to the fact that the engine 1 is inherently of the impulse type and does not exert a strictly continuous rotary effort at the crankshaft.

While the invention is intended primarily to provide constant frequency at the generator for a change in load, the fact that the shaft 6 is rotated at a strictly uniform speed regardless of load also brings about a decided improvement in the voltage regulation at the generator. This is illustrated in Figure 4, in which the curve $d$ plotted against terminal volts as an ordinate and k. v. a. load as an abscissa, graphically depicts the voltage regulation of the alternator, using an ordinary speed governor but without the improved control feature of this invention. The curve $e$ illustrates the improvement brought about by the use of the Sylphon 18 which responds to the intake vacuum to give a new setting to the butterfly valve 59 and operating in conjunction with the speed governor. It will be noted that the curve $e$ shows a much flatter regulation than the curve $d$.

While I have described my improvement in terms of an increase in load, it will be understood that the bellows 18 also responds to an increase in the intake vacuum when the engine is speeded up, due to reduced load conditions. Under these circumstances the bellows will expand and in operating through the described linkage, will give a new setting to the butterfly valve 59 by which the amount of fuel gas passing from the carburetor to the intake manifold is reduced.

In Figure 6 there is shown a modification in which the Sylphon bellows is employed to change the length of the connecting rod between the arm 45 and the butterfly valve lever 58, and thus provide adjustment in this manner. The conduit 15 is taken through the valve 16 to a flexible tubing 62 which communicates with the interior of a Sylphon bellows 63. The end plates 64, 65 are not rigidly mounted but are adapted to swing right or left from the position shown in the figure. The plate 64 is provided with an internally projecting collar 66 which slidably receives a rod 67, provided with a circular disc 68 and rigidly secured to the end plate 65 by a nut 69. There is a compression spring 70 positioned within the bellows between the end plate 64 and the disc 68. The end plate 64 is secured, through a rod 71, to the butterfly valve arm 58. The end plate 65 is connected to the arm 45 through a rod 72 which is adapted to rock within the arm 45, as indicated at 73. The fly ball governor 7 is somewhat similar to that described in connection with Figure 5 except that the pivoted arms 50, 51 and the cap screw 54 have been eliminated, the spring 49 being connected at the right-hand end to a threaded rod 74 screwed in a flange 75 provided on the rim of the governor.

*Operation of the structure shown in Figure 6*

As the load on the generator 9 increases, which would normally cause a reduction in the generated frequency, the speed of the engine 1 tends to decrease and its intake vacuum also tends to decrease. Inasmuch as the effect of the vacuum is applied to the interior of the bellows 63 instead of to the exterior of the bellows, as in the case of Figure 5, the bellows now will expand with the assisting action of the spring 70 and in effect increase the length of the connecting rod portions 71, 72, which separate the butterfly valve arm 53 from the speed governor arm 45. This increase in connecting rod length moves the arm 53 counterclockwise to open the butterfly valve 59 to admit larger quantities of fuel gas to the intake manifold, thus, in effect to increase the speed of the engine. It will be noted that no change has been made either in the structure or the operation of the fly ball governor 7, so that the latter is free to exercise its usual speed control function. Thus the butterfly valve is given a new setting in response to the change in load at the generator, and the speed governor exercises further control over the butterfly valve in response to changes in speed of the engine.

The modification shown in Figure 8 employs still different structure for providing strict uniformity of speed at the generator, regardless of the amount of electrical load or the abruptness with which the load is applied or withdrawn. In this case the intake vacuum is conducted through the conduit 15 and valve 16 to the interior of a metal tube 76. This tube is closed at its upper end by a closure member 77, in which is threaded a rod 78 which passes through a locknut 79 mounted on top of the closure member. The lower end of the rod 78 contacts a disc 80, against which bears a compression spring 81 contained within the tube 76. The latter is secured to the upper face of a bellows 82, which face is held rigidly in space, as indicated at 83, and may be secured to any portion of the engine.

The lower end 84 of the bellows is provided with an upstanding tube 85 which extends internally of the bellows and receives the lower end of the spring 81. The tubes 76 and 85 are preferably in line with one another but are not directly secured together. The end 84 of the bellows is connected through a lever 86, pivoted at 87 to an arm 88 which terminates at its left-hand end in a circular enlargement 89 provided with an eccentrically located pin 90. The pin 90 is secured to an inner ball race 91, the ball bearings being indicated at 92 and contained within an outer ball race 93. The pin 90 is extended through the ball bearing and is held in position by a strap 94 which is secured to a downwardly extending bracket 95 by the bolts 96. The bracket 95 may be mounted on any suitable portion of the engine. The outside periphery of the ball race 93 is adapted to bear against the right-hand end of the cap screw 54 which has the same function as was explained in connection with the similar element of Figure 5. It will be noted that the ball bearing structure 91, 92, 93, in effect, constitutes a cam so that as the pivot point 87 is moved upwardly or downwardly the outer surface of the member 93 will cause the arms 50, 52 to rock on their pivot 51. By arranging the pin 90 eccentric with respect to the ball bearing structure and the circular portion 89 of the arm 88, the necessity for a bellcrank lever such as the structure 32, 33 of Figure 5 is eliminated.

As the intake vacuum in the manifold 4 is reduced, due to the imposition of a load at the generator 9, the bellows 82 will elongate downwardly from the fixed point 83, swinging the arm 86 clockwise and causing the rocker arm elements 50, 52 to move in the counterclockwise direction about their pivot 51. The butterfly valve 59 is therefore given a new setting, causing the valve to open further in order to admit more fuel gas to the manifold. The spring 81 serves to assist the bellows 82 to expand against the pressure of the atmosphere changes effectively applied to the outside surface of the bellows. The threaded rod 78 may be turned to effect any change in adjustment of the spring 81, and the rod is then locked in position by the nut 79.

Instead of employing a bellcrank lever mounted on a ball bearing for translating the movement of the element 27, as in Figure 5, to a horizontal movement at the screw member 54, or a modified form of ball-bearing-mounted cam, as seen in Figure 8, there may be employed a simple lever system for effecting these movements. Thus in Figure 9 the strap 29 is provided with a pivot 97 formed by a screw, and a lever 98 is adapted to swing about the pivot, one end of the lever being connected to a rod 99 which extends downwardly from the bellows 100, and the other end of the lever may be connected through a link 101 to a pivot 102 provided on the end of the screw 54. In this modification the bellows 100 may be of the type shown and described in connection with Figure 5, in which case the bellows is contained in a casing and its exterior is subjected to the intake vacuum. On the other hand, the bellows 100 may be of the type explained in connection with Figure 8, in which the intake vacuum is introduced to the interior of the bellows.

From the foregoing it is evident that I have disclosed various structures by which the butterfly or other fuel valve 59 is given a new setting when the load changes, and this setting is controlled by the intake vacuum of the engine. In Figure 5 the vacuum is taken to the outside of the Sylphon bellows, whereas in Figure 8 the vacuum is taken to the interior of the bellows so that the bellows responds in the opposite manner for a given change in the vacuum, but in both cases the movement of the bellows is carried through a speed governor to effect the proper change in the position of the valve.

It will be understood that I desire to comprehend within my invention such modifications as come within the scope of the claim and the invention.

Having thus fully described my invention, what I claim as new and desire to secure by Letters Patent, is:

In combination, an internal combustion engine subject to variable loads, a governor, a valve in the intake of said engine, a lever connected to said valve and a second lever connected to and operated by said governor, linkage means connecting said levers, and a bellows the operation of which is controlled by the pressure of the intake manifold on the engine side of the valve, said bellows having opposite end plates and being mounted on and supported by said linkage means to cause said linkage means to be lengthened or shortened according to the engine fuel pressure, said bellows being located between said valve and said governor whereby the engine speed is maintained constant notwithstanding changes in the engine load, said linkage means consisting of a pair of rods whose one end is connected to each lever respectively and whose opposite end is connected to each end respectively of the said opposite end plates of said bellows.

EDWARD A. HOBART.